Patented Nov. 30, 1937

2,100,401

UNITED STATES PATENT OFFICE 2,100,401

MANUFACTURE OF ORTHO- AND PERI-ARYL DINITRILES

Reginald Patrick Linstead, South Kensington, London, and Arthur Reginald Lowe, Blackley, Manchester, England, assignors to Imperial Chemical Industries Limited, a corporation of Great Britain No Drawing. Application August 4, 1936, Serial No. 94,284. In Great Britain January 13, 1933

11 Claims. (Cl. 260—99.30)

This invention relates to the manufacture of aryl nitriles from aromatic dicarboxylic acids and from those aromatic compounds which result from the combination of aromatic dicarboxylic acids with ammonia. More particularly this invention relates to improved processes for effecting the catalytic conversion of phthalic anhydride or phthalimide into phthalonitrile.

This application is a continuation-in-part of our copending application Serial No. 706,150, filed January 10, 1934, now Patent No. 2,054,088 wherein we have disclosed the production of aryl dinitriles by a process which consists of submitting a gaseous mixture of ammonia and an ortho- or peri-aryl dicarboxylic acid, anhydride, imide or mono- or diamide to a high temperature while passing the mixture over a suitable dehydration catalyst.

The present application has as its object to point out more fully and to claim certain special features of the process described in said copending application, which features while not absolutely essential to the successful operation of the process, nevertheless contribute materially toward the obtaining of high yields of the desired main product. These special features are therefore in the nature of an improvement upon the main process described and claimed in general terms in our said copending application.

The special features above referred to, and constituting the essence of the present improvements, are based on the observation that particularly high conversions of the initial material to phthalonitrile and an extraordinary freedom of the main reaction products from by-products may be obtained by adhering to certain specific operating conditions of temperature, time of contact, and molecular excess of ammonia. The catalysts that may be used in the practice of this invention are the same dehydrating catalysts described in our original application for letters patent and are those also described by Sabatier and Reid, "Catalysis in Organic Chemistry", London, 1923, sections 691-818. In speaking of dehydrating catalysts such as alumina or thoria we include only those dehydrating catalysts which, like alumina and thoria, are solid and stable at the temperatures of this reaction and which, like alumina and thoria, do not readily enter into permanent combination with any of the components of the above mentioned gaseous mixture. Catalytically pure alumina is a particularly suitable dehydration catalyst and high yields are obtainable with a remarkable degree of catalyst stability. We have seen no evidence that either alumina or silica gel combine with the aryl dinitriles when formed. But if the catalyst contains a metal of the type which reacts readily with phthalonitrile to give a metal-phthalocyanine coloring matter, for instance copper, iron, nickel or zinc, then there is danger that this metal impurity will interact with the aryl dinitriles to give a coloring matter (see British Patent No. 410,814), with consequent interference with the catalytic action, or that it will cause a decarboxylation, resulting in the formation of an aromatic mononitrile, such as benzonitrile, as a by-product. It appears therefore that while other dehydrating catalysts may be used in the processes of this invention, either alumina or silica, relatively free from iron, is apt to be the most convenient and effective catalyst. The dehydrating oxides may be employed alone, preferably in a surface-active physical condition or they may be employed as compounds or mixtures with each other or with such other elements as may be used to enhance the dehydrating action.

By high temperatures we mean to include temperatures in the range of 360° to 550° C. but preferably in the more restricted range of 400° to 500° C. Specific temperatures in these ranges suitable for different starting materials and catalysts are mentioned in the examples.

In carrying the invention into practical operation, the gaseous mixture may be conveniently obtained by vaporizing the aryl dicarboxylic-anhydride, -imide, or -mono- or -di-amide and passing it along with ammonia gas over the heated catalyst. Other substances which will give a gaseous mixture containing ammonia and aryl dicarboxylic-anhydride, -imide, or -mono- and i-di-amide, such as phthalic acid and ammonia, may be used instead of the aryl dicarboxylic-anhydride, -imide, or -mono- or -di-amide themselves. However, for best results, it is quite important to maintain a proper excess of ammonia over and above that theoretically required for combination with the aromatic dicarboxylic compound undergoing conversion to dinitrile. If this excess be too small, then there is danger of excessive side reactions, such as the formation of mononitriles or the polymerization of the dinitriles upon the surface of the catalyst. On the other hand, if the excess be too great, the input of the aromatic dicarboxylic compound must be reduced to an uneconomic point or else conversion will be incomplete in so rapid a passage over the catalyst. In practice we prefer to employ a molal excess of ammonia of from 5 to 25 times that theoretically required; for example, for each molecule of phthalic anhydride or phthalimide undergoing conversion to phthalonitrile there should be at least 5 mols of ammonia and preferably not more than 25.

As indicated above, the time in which the reaction mixture is in contact with the catalyst in its passage through the reaction zone is also a factor in the success of the process. This is, of course, a function of the rate of flow of the gas stream which is commonly referred to as the "space velocity". The figures given under the heading "space velocity" in the table of Example 3, define the number of volumes of the gaseous reactants, calculated as at standard conditions, that pass per hour through a unit volume of space occupied by the catalyst. The term "time of contact" which stands at the head of another column is defined as the time in seconds which the reactants require to traverse the entire space occupied by the catalyst at the operating conditions of temperature and pressure, assuming no change in volume. Time of contact may be derived from the space velocity as follows:

Time of contact
$$= \frac{273 \times 60 \times 60}{(273 + \text{temp. in °C.}) \times \text{space velocity}}$$

Time of contact is an exceedingly important and fundamental variable in all contact reactions and especially so in processes such as the conversion of aromatic dibasic acid compounds to dinitriles wherein secondary reactions may set in if the exposure to the catalyst is unduly prolonged. It has been found for example that the formation of phthalonitrile from phthalic anhydride or phthalimide over silica gel is a rapid reaction, while the less desirable secondary reaction of forming benzonitrile is a relatively slow reaction. Therefore it is necessary to control the rate of passage over the catalyst in such a way that the time of contact will fall between certain operative limits. If the time is too short the reaction is incomplete; if the time is too long the reaction may go too far. In actual practise in the preparation of aromatic dinitriles by catalysis, we prefer to pass the gaseous mixture over the catalyst at such a rate that times of contact in the range 2 to 24 seconds are obtained. Two seconds will in many cases give rise to high conversions to dinitriles, while side reactions may not become excessive until values higher than 24 are in general obtained.

The preferred practise of the invention is more clearly illustrated by reference to the following examples which, however, are not intended to limit this invention. Parts mentioned are by weight.

Example 1

Molten phthalimide is fed through a horizontal column of thoria maintained at 485–490° C. A vigorous stream of ammonia is also passed through, so that ammonia is always present in the issuing gases. The liquid and gaseous reaction products are condensed in a large cooled receiver. The solid condensate is then broken up and stirred with caustic soda solution to remove unchanged phthalimide and alkali-soluble by-products. After filtration and washing, there remains almost pure phthalonitrile, melting at 138–140° C.

Example 2

Twenty-five parts of phthalimide are heated and the resulting vapor is passed during one hour over 288 parts of silica gel maintained at 360° C. A stream of ammonia is also passed with the phthalimide vapor at such a rate that there is always plenty of ammonia present in the issuing gases; this is a rate of about 2.5 cu. ft. per hour if the parts aforementioned are in grams. These rates of flow provide an ammonia-phthalimide molecular ratio of about 18.7 and a contact time of about 13.6 seconds. The liquid and gaseous reaction products are condensed in a large cooled receiver. The solid condensate is then powdered and stirred with aqueous caustic soda to remove unchanged phthalimide and alkali-soluble by-products, and to convert any phthalimide into ammonia and alkali-soluble products. After filtration and washing, there remains almost pure phthalonitrile, melting at 138–140° C. The yield is 75 per cent of the theoretical (calculated on the phthalimide).

Example 3

This is a composite example which will serve to indicate the particular combinations of operating conditions we have found suitable for use in the preparation of aryl dinitriles. When using these conditions conversions per pass amounting to 75–90 per cent are obtained with very little difficulty arising from the formation of by-products such as benzonitrile. In each of the experiments tabulated below 25 g. of the organic compound indicated in the first column were passed over the catalyst in the time indicated while the ammonia flow was maintained at 54 g. (equal to 2.5 cu. ft.) per hour.

| Starting material | Length of run, hours | Temp. °C. | Catalyst Type | Apparent density | Volume liters | Total gas vol. passed per hour, liters | NH₃ ratio | Space velocity | Contact time, seconds |
|---|---|---|---|---|---|---|---|---|---|
| Phthalimide | 1.0 | 360 | Silica gel | 0.44 | 0.655 | 74.9 | 18.7 | 114 | 13.6 |
| Do | 2.0 | 450 | Thoria-on-asbestos | 0.22 | 1.310 | 73.0 | 37.4 | 56 | 24.3 |
| Do | 1.0 | 410 | Activated alumina | 0.90 | 0.320 | 74.9 | 18.7 | 234 | 6.2 |
| Do | 1.0 | 400 | Bauxite | 0.90 | 0.320 | 74.9 | 18.7 | 234 | 6.2 |
| Do | 1.0 | 440 | Kaolin | 0.48 | 0.600 | 74.9 | 18.7 | 125 | 11.0 |
| Do | 1.0 | 485 | Kieselguhr | 0.50 | 0.576 | 74.9 | 18.7 | 130 | 9.8 |
| Do | 1.0 | 370 | Silica gel | 0.44 | 0.655 | 74.9 | 18.7 | 114 | 13.4 |
| Phthalic anhydride | 1.0 | 485 | Kieselguhr | 0.50 | 0.576 | 72.6 | 47.4 | 126 | 10.3 |
| Do | 2.5 | 495 | Thoria | 2.16 | 0.133 | 72.2 | 62.2 | 543 | 2.4 |
| Phthalamide | 3.0 | 500 | Silica gel | 0.44 | 0.655 | 75.2 | 17.3 | 115 | 11.0 |
| 4-chloro-phthalimide | 0.75 | 500 | do | 0.44 | 0.655 | 76.7 | 12.5 | 117 | 10.9 |
| 1,2-naphthalimide | 0.5 | 500 | do | 0.44 | 0.655 | 76.7 | 12.5 | 117 | 10.9 |
| 2,3-naphthalimide | 0.5 | 500 | do | 0.44 | 0.655 | 74.9 | 18.8 | 114 | 13.0–12.1 |
| 1,8-naphthalic anhydride | 0.75 | 390–440 | do | | | | | | |

The ortho- and peri-aryl dinitriles obtained according to the above process are valuable intermediates for the manufacture of dyestuffs, for instance, for the manufacture of complex nitrogenous coloring matters according to the process of copending application Serial No. 698,216 (British Patent No. 410,814).

It will be understood that, while we have described above our preferred procedure with great particularity, the latter is susceptible of wide variation and modification within the skill of those conversant with this art.

We claim:

1. A process for the manufacture of aryl nitriles which comprises heating a gaseous mixture comprising a molecular excess of ammonia and a member of the group consisting of ortho-phthalic acid, ortho-phthalic anhydride, phthalamic acid, phthalimide, and phthalamide at a temperature between 360° and 550° C. for a period of time between about 2 seconds and about 24 seconds in the presence of a catalyst adapted to transform an amide into a nitrile.

2. A process for the manufacture of ortho-phthalonitrile which comprises passing a molecular excess of gaseous ammonia together with the vapor of a compound selected from the group consisting of phthalimide and phthalic acid derivatives capable of reacting with ammonia to form phthalimide, over a heated dehydration catalyst which is solid and stable at the reaction temperature and which does not readily enter into permanent combination with any of the components of the above gaseous mixture, the gases being passed over said catalyst at such a rate that the time of contact of the reactants with the catalyst is maintained at about 2 to 24 seconds.

3. A process as in claim 2, in which the excess of ammonia is a least 5 times the amount theoretically required to react with the phthalimide undergoing conversion to phthalonitrile.

4. The process of producing an aromatic ortho-dinitrile of the benzene or naphthalene series which comprises passing a gaseous mixture of an ortho-dicarboxylic acid imide of the benzene or naphthalene series and an excess of ammonia in contact with a catalyst comprising essentially aluminum oxide at a temperature between about 400° and 500° C. and at a time of contact between about 2 and 24 seconds.

5. The process of claim 4 in which the molecular ratio of ammonia to the aromatic dicarboxylic imide is between 5 and 25.

6. The process which comprises passing a mixture of phthalimide vapor and excess ammonia over an alumina catalyst heated at a temperature between 400° and 500° C. at such a rate that a contact time between 2 and 24 seconds is maintained, and thereafter separating water and unreacted ammonia from the recovered phthalonitrile.

7. The process of producing an aromatic ortho-dinitrile of the benzene or naphthalene series which comprises passing, at a temperature between 360 and 550° C., a gaseous mixture of an ortho-dicarboxylic acid imide of the benzene or naphthalene series and an excess of ammonia in contact with a catalytically active dehydrating metal oxide substantially free from ferrous metal components which catalyze the formation of mononitriles.

8. The process of claim 7 wherein the catalyst is an iron-free silica gel.

9. In the process of producing an ortho-arylene-dinitrile by passing a gaseous mixture comprising ammonia and an ortho-aryl-dicarboxylic acid derivative of the general formula

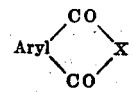

wherein X stands for O or NH, over a heated dehydrating catalyst of the group consisting of alumina, silica, thoria and combinations of these, the improvement which consists of selecting the initial materials in such proportions that the molal ratio of ammonia to the organic compound of the above formula is between 5 and 25 to 1, and passing the gases through the catalyst at such a rate that the resulting time of contact is between 2 and 24 seconds.

10. The process of producing phthalonitrile, which comprises passing a mixture of ammonia and phthalimide in a molal ratio of between 5 and 25 to 1, at a temperature between 400° and 500° C. over a heated catalyst selected from the group consisting of alumina, silica, thoria and combinations of these, the rate of flow of gases being controlled so that the resulting contact time is between 2 and 24 seconds.

11. The process of producing phthalonitrile, which comprises passing a mixture of ammonia and phthalic anhydride in a molal ratio of between 5 and 25 to 1, at a temperature between 400° and 500° C. over a heated catalyst selected from the group consisting of alumina, silica, thoria and combinations of these, the rate of flow of gases being controlled so that the resulting contact time is between 2 and 24 seconds.

REGINALD PATRICK LINSTEAD.
ARTHUR REGINALD LOWE.